UNITED STATES PATENT OFFICE.

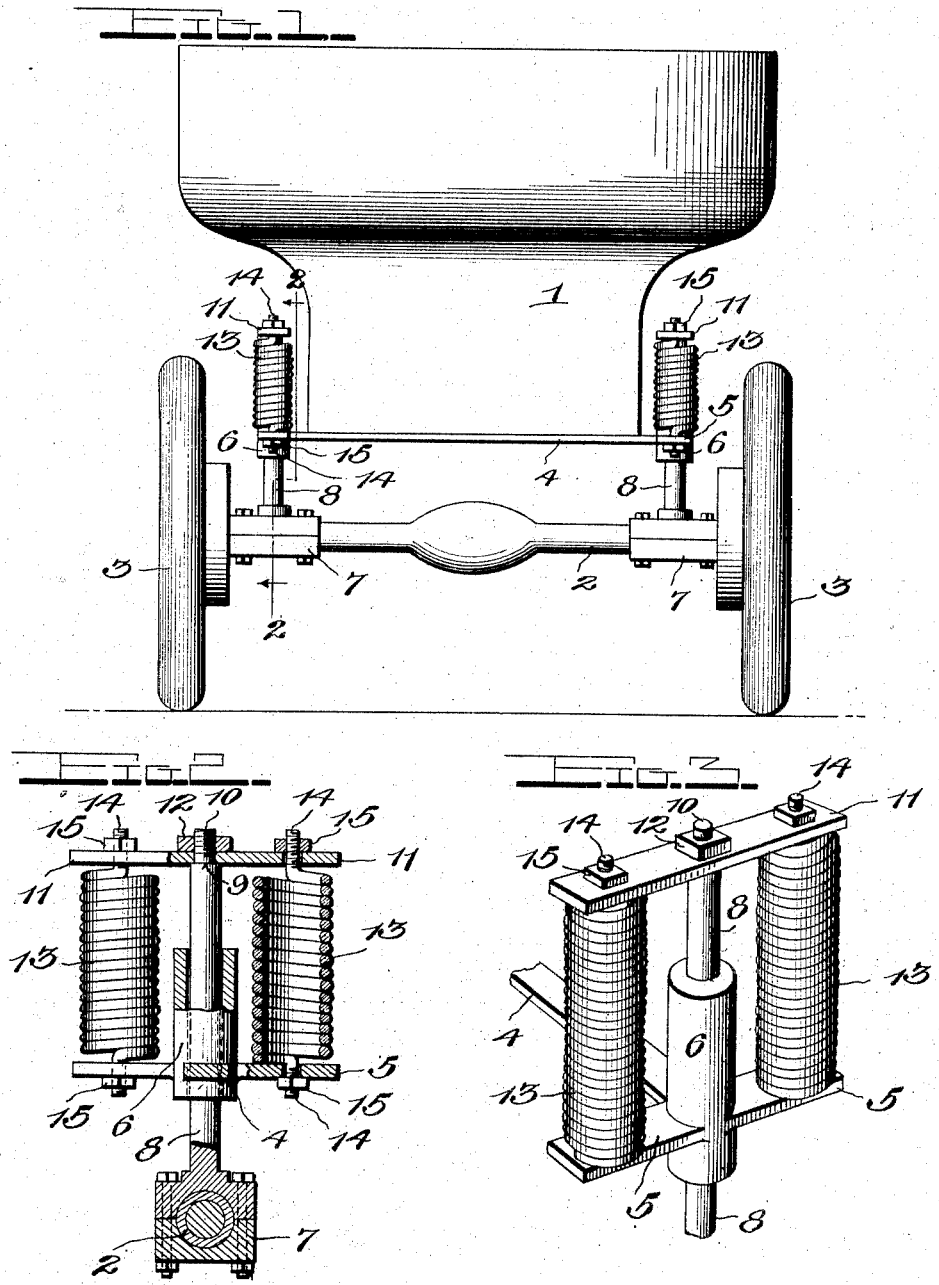
T. D. ALLEN.
AUTOMOBILE SPRING.
APPLICATION FILED APR. 13, 1914.
1,108,310. Patented Aug. 25, 1914.
Inventor
Thaddeus D. Allen,
Witnesses

THADDEUS D. ALLEN, OF YOUNGSTOWN, OHIO.

AUTOMOBILE-SPRING.

1,108,310.  Specification of Letters Patent.  Patented Aug. 25, 1914.

Application filed April 13, 1914. Serial No. 831,503.

*To all whom it may concern:*

Be it known that I, THADDEUS D. ALLEN, a citizen of the United States, residing at Youngstown, in the county of Mahoning and State of Ohio, have invented certain new and useful Improvements in Automobile-Springs; and I do declare the following to be a full, clear, and exact description of the invention, such as will enable others skilled in the art to which it appertains to make and use the same.

This invention relates to new and useful improvements in vehicle springs and more especially to springs for use in connection with automobiles and the primary object of the invention is to provide a device of this character which will eliminate the use of the large and cumbersome elliptical spring, this form of spring being a coiled spring which is considerably cheaper and equally as if not more efficient than the springs now in use on automobiles.

A further object of the invention resides in providing such a coil spring structure as will afford not alone a suspension means for the body of the vehicle on the axle, but which will also act as a shock absorber therefor.

A still further object resides in providing a device which is simple and durable in construction, inexpensive to manufacture and one which will be very efficient in use.

With these and other objects in view the invention consists in the novel features of construction, combination and arrangement of parts as will be hereinafter referred to and more particularly pointed out in the specification and claims.

In the accompanying drawing forming part of this application:—Figure 1 is a rear elevation of a vehicle showing a device constructed in accordance with my invention applied to use thereon. Fig. 2 is a section therethrough as seen on line 2—2, Fig. 1; and, Fig. 3 is a detail perspective view of one of the spring supports removed.

In describing the invention I shall refer to the drawing in which similar reference characters designate corresponding parts throughout the several views and in which—

1 indicates a vehicle body of the usual or any preferred type, I having shown an automobile body in the official drawing, the same being adapted for support above an axle 2 which has the wheels 3 suitably mounted at the ends thereof in the usual or any preferred manner. My improved device contemplates the provision of suspension means between the axle and the body which suspension means will, in addition to acting as the ordinary spring for the body of the vehicle, also act as a shock absorber. To this end I provide a supporting bar or the like 4 which is secured to the under face of the body in any preferred manner the ends of which project beyond the sides of the body and the outer ends thereof have the T-shaped head pieces 5 formed thereon. This bar 4 is, as shown in the drawing, secured transversely of the body so that the head pieces 5 project longitudinally thereof and formed centrally on each of said head pieces 5 is a vertically extending sleeve or bearing 6 which projects above and below each piece 5 the greater extending portion being disposed above said head piece.

Secured to the axle 2 adjacent each end thereof through the medium of a clamping member indicated as 7 is a vertically extending post 8, said posts being guided through the sleeves or bearings 6 above referred to. The upper ends of said posts 8 are reduced in thickness to provide shoulders 9 and these reduced upper ends are threaded as shown at 10 and disposed through openings in additional plates or strips 11 the latter being of the same size as the head pieces 5 on the ends of the bar 4. Nuts 12 are engaged with the threaded ends 10 of said posts 8 and when turned home said nuts secure the plates or strips 11 in position with respect to said posts.

Thus it will be seen that on each side of the vehicle body 1 adjacent the ends of the axle is provided a frame formed by the spaced apart strips or plates 11 and 5 and disposed between each pair of plates is a pair of coil springs 13, one spring being disposed on each side of each post 8. The end coils of each pair of coil springs 13 has the free ends thereof bent inwardly and thence outwardly as indicated at 14 these outwardly bent portions extending in the plane of the longitudinal centers thereof and disposed also through openings in the plates 11 and 5. These outwardly extending ends 14 of the end coils of the springs 13 are threaded and engaged with nuts 15 the latter obviously securing said springs to the plates and also securing the latter in position with respect to one another.

It will be seen from this construction that the body will be properly supported above the axle and capable of yielding with respect thereto this yielding action being such as is necessary in the propulsion of the vehicle and this construction will obviously also afford shock absorbing means which is necessary when the device is used in connection with automobiles. It will also be seen that the device is simple and durable in construction, extremely inexpensive to manufacture and one which will be very efficient in use.

While I have particularly described the elements best adapted to perform the functions set forth, it is obvious that various changes in form, proportion and in the minor details of construction may be resorted to, within the scope of the appended claims, without departing from the spirit or sacrificing any of the principles of the invention.

Having thus described my invention, what I claim is:

1. In a device of the class described, the combination with a body and an axle therebelow; of a transverse bar secured to said body and having longitudinally extending strips at the ends thereof, vertically extending arms carried on said axle adjacent the ends thereof and guided loosely through said strips, additional strips carried on the upper ends of said arms and coil springs secured between said strips.

2. In a device of the class described, the combination with the body of a vehicle and an axle; of a transverse bar secured to the under face of said body and projecting beyond the sides thereof, the ends of said bar terminating in longitudinal strips, vertically extending bearings formed centrally of said strips, arms removably secured to said axle adjacent the ends thereof and slidably disposed through the aforesaid bearings, additional strips carried on the upper ends of said arms and coil springs secured between said strips on opposite sides of said arms and bearings.

3. In a device of the class described, the combination with a vehicle body of an axle therefor; of a transverse bar secured to the body and projecting beyond the sides thereof, the ends of said bars terminating in longitudinal strips, vertically disposed bearings formed centrally of said strips and projecting above and below the same, the upper portion projecting to a greater degree than the lower portion thereof, vertically extending arms removably secured to said axle adjacent the ends thereof and guided through said bearings, additional strips removably secured to the upper ends of said arms in alinement with the aforesaid strips, and coil springs removably secured between said strips on opposite sides of said bearings and arms.

4. In a device of the class described, the combination with a body and an axle therefor; of a transverse bar secured to the under face of said body and projecting beyond the sides thereof, the ends of said bar terminating in longitudinal strips, vertically extended bearings formed centrally of said strips and projecting above and below the same, the upper projecting portion extending to a greater degree than the lower projecting portion thereof, vertically extending bars removably secured to said axle adjacent the ends thereof and loosely disposed through said bearings, an additional strip removably secured to the upper end of each arm in alinement with the strip therebelow, coil springs disposed between said strips on opposite sides of said bearings, the end coils of said springs having the ends thereof bent and disposed loosely through said strips, the last mentioned portions of said coils being threaded, and nuts engaged with the threaded portions of said springs whereby to secure the latter in position between said strips.

In testimony whereof I have hereunto set my hand in presence of two subscribing witnesses.

THADDEUS D. ALLEN.

Witnesses:
L. A. DOLWICK,
HENRY HAWKINS.